United States Patent [19]

Oh

[11] Patent Number: 5,220,424

[45] Date of Patent: Jun. 15, 1993

[54] CIRCUIT FOR IMAGE SIGNAL TRANSMISSION AND RECEPTION BY ADAPTIVE MODULATION AND A METHOD THEREFOR

[75] Inventor: Jin-Sung Oh, Suwon, Rep. of Korea

[73] Assignee: SamSung Electronics Co., Ltd., Suwon, Rep. of Korea

[21] Appl. No.: 701,061

[22] Filed: May 16, 1991

[30] Foreign Application Priority Data

Jun. 1, 1990 [KR] Rep. of Korea ............... 1990-8102

[51] Int. Cl.$^5$ ..................... H04N 7/04; H04N 5/14
[52] U.S. Cl. ..................................... 358/141; 358/167
[58] Field of Search ............... 358/141, 167, 36, 133, 358/166, 37; 370/81; 360/36.2

[56] References Cited

U.S. PATENT DOCUMENTS

| | | | |
|---|---|---|---|
| 2,881,427 | 11/1957 | Huber | 358/141 |
| 4,262,304 | 5/1981 | Faroudja | 358/37 |
| 4,318,126 | 3/1982 | Sassler | 358/141 |
| 4,459,613 | 7/1984 | Faroudja | 358/167 |
| 4,779,133 | 10/1988 | Sugimori et al. | 358/167 |
| 4,897,832 | 1/1990 | Suzuki et al. | 370/81 |
| 5,016,100 | 6/1991 | Citta et al. | 358/144 |
| 5,128,757 | 7/1992 | Citta et al. | 358/144 |

Primary Examiner—James J. Groody
Assistant Examiner—Glenton B. Burgess
Attorney, Agent, or Firm—Robert E. Bushnell

[57] ABSTRACT

A circuit for transmitting and receiving an image signal by means of an adaptive modulation in a system having a transmitter and a receiver. A low band image signal output the transmitter is transmitted to a noise reducer (101) of the receiver (20), to thereby restore the low band image signal from the transmitter. A high band image signal of the transmitter is delayed for a given time to be multiplied by a first adaption factor generated from a first adaption converter; and the multiplied high band image signal is non-linearly converted by a first nonlinear linear converter so as to be transmitted to a second nonlinear linear converter of the receiver. The transmitted high band image signal is converted non-linearly by the second nonlinear converter such that noise component of the high band image signal with lower amplitude is relatively reduced more significantly than that of the high band image signal with higher amplitude. The converted high band image signal is divided by a second adaption factor output from a second adaption converter to thereby restore the high band image signal from the transmitter.

16 Claims, 6 Drawing Sheets

CIRCUIT FOR IMAGE SIGNAL TRANSMISSION AND RECEPTION BY ADAPTIVE MODULATION AND A METHOD THEREFOR

DETAILED DESCRIPTION OF THE INVENTION

The present invention relates to a circuit and a method for image signal transmission and reception in a high definition television. More particularly, the invention relates to a method and a circuit for image signal transmission and reception by adaptive modulation to reduce the noise of transmission channel adaptively according to each band of an image signal when the; image signal is transmitted by dividing each band of the image signal into a plurality of subbands.

Generally speaking, adaptive modulation derives its origin from a general idea of pseudo noise quantization to remove the degradation of edge of the image signal caused by quantizing noise.

The image signal transmission and reception technique suggested by the United States Advanced Television (hereinafter referred to as ATV) is the use of subband coding as an image band compression algorithm. It was the method for collectively performing the noise reduction process in each band by dividing an image signal band into high and low frequency band components.

Since the low band image signal component in the image signal band compression algorithm is a low frequency component both spatially and temporally, noise will increase in the decoder of the receiver if the low band image signal component has channel noise which contributes to the degradation of the quality of pictures if the channel noise is not removed in restoring the high band image signal component having low amplitudes; and

SUMMARY OF THE INVENTION

It is therefore an object of the present invention to provide a method and a circuit for image signal transmission and reception by adaptive modulation to adaptively reduce the noise of transmission channel according to each band.

It is another object of the present invention to provide a method for adaptively modulating a high band image signal according to the logic of adaption factor table.

It is still another object of the present invention to provide a method for processing a low band image signal in a receiver through a noise reducer having the characteristic of a time accumulation filter.

It is yet another object of the present invention to provide a method for high band image signal processing in the receiver through a non-liner converter introducing the conception of coring which removes channel noise of the high band image signal having low amplitudes.

According to the present invention, a circuit for transmitting and receiving an image signal by means of an adaptive modulation in a system having a transmitter (10), a receiver (20). A low band image signal output from the transmitter (10) is transmitted to a noise reducer (101) of the receiver (20) to thereby restore the low band image signal from the transmitter (10). A high band image signal from the transmitter (10) is delayed for a given time to be multiplied by a first adaption factor generated from a first adaption converter (50); and the multiplied high band image signal is non-linearly converted by a first non-linear converter (16) so as to be transmitted to a second non-linear converter (102) of the receiver (20). The transmitted high band image signal is converted non-linearly by the second non-linear converter (102) such that noise components of the high band image signal having lower amplitudes is relatively reduced more significantly than that of the high band image signal having higher amplitudes. The converted high band image signal is divided by a second adaption factor generated from a second adaption converter (70); and to hereby restore the high band image signal output from the transmitter (10).

BRIEF DESCRIPTION OF THE DRAWINGS

For a better understanding of the invention and to show how the same may be carried into effect, reference will now be made, by way of example, to the accompanying diagrammatic drawings, in which.

FIG. is a block diagram for showing a circuit for transmitting and receiving an image signal by adaptive modulation: according to the present invention.

DETAILED DESCRIPTION OF THE INVENTION

Figure 1:
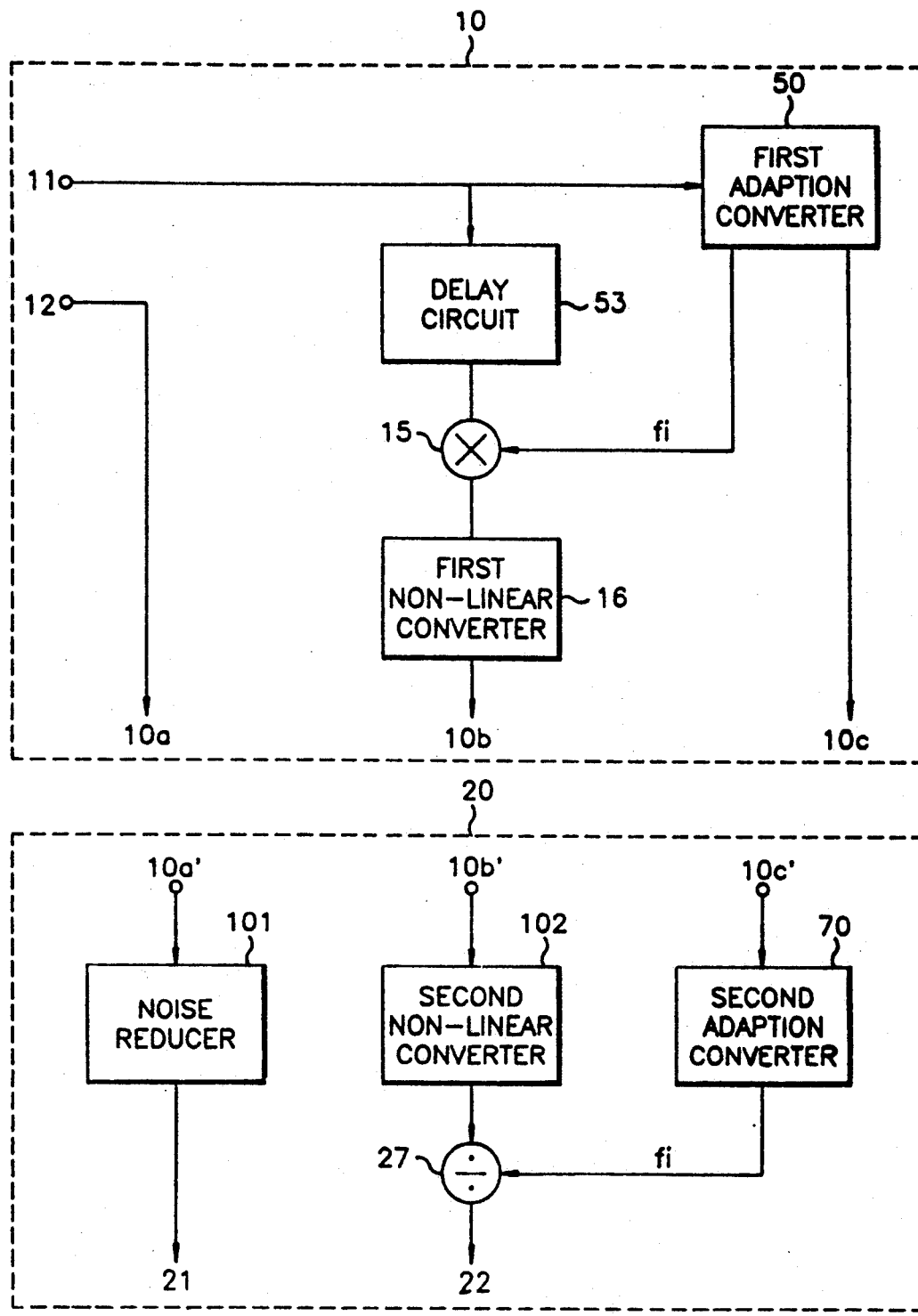

Referring to FIG. 1, the circuit comprises a transmitter 10 and a receiver 20. In transmitter 10, a low band image signal output from a low band image signal input terminal 12 is transmitted through a low band image signal output terminal 10a without having a noise reduction process. A high band image signal output from a high band image signal input terminal 11 is delayed for a given time by a delay circuit 53. The high band image signal of the high band image signal input terminal 11 is applied to a first adaption converter 50 for producing a first adaption factor fi and adaption index information. The delayed high band image signal output from the delay circuit 53 is multiplied by the first adaption factor fi output from the first adaption converter 50 by a multiplier 15. The high band image signal multiplied by the multiplier 15 is converted non-linearly by a first non-linear converter 16 and then transmitted to the high band image signal output terminal 10b. The adaption index information output from the first adaption converter 50 is transmitted to the adaption index information output terminal 10c.

On the other hand, in the receiver 20, the signal received through a low band image signal reception input terminal 10a' is low-pass filtered by a noise reducer 101 and then transmitted to the low band image signal reception terminal 21. The signal received through a high band image signal reception input terminal 10b' is clipped by a second non-linear converter 102 below a given level. The signal received through adaption index information reception input terminal 10c' is applied to a second adaption converter 70 for producing a second adaption factor fi. The signal output from the second non-linear converter 102 is divided by the second adaption factor fi output from the second adaption converter 70, according to the adaption factor table so that transmitted the divided signal can be transmitted to the high band image signal reception terminal 22.

Figure 2:
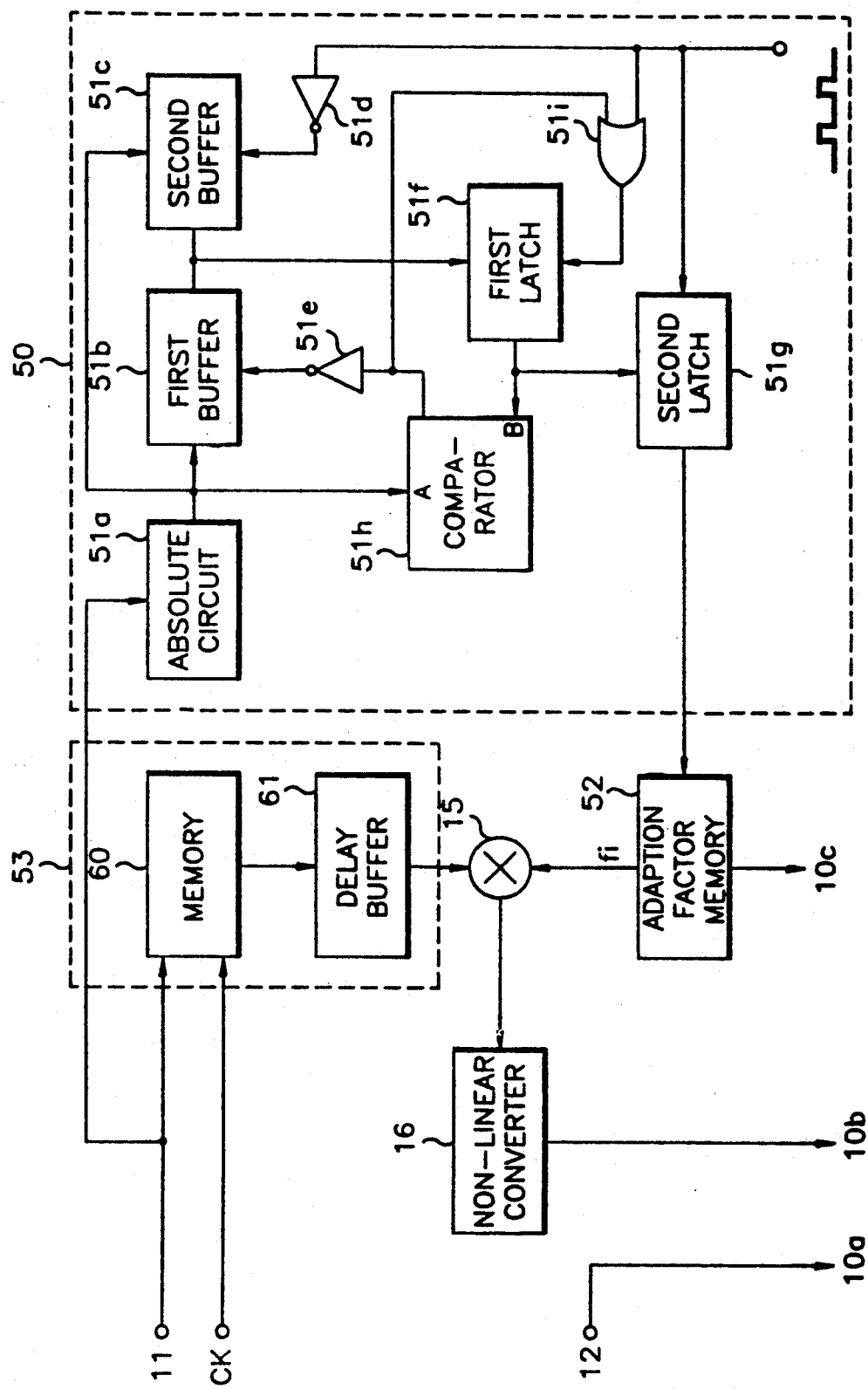
FIG. 2 is a detailed block diagram of transmitter 10 shown in FIG. 1.

Referring to FIG. 2, the delay circuit 53 has a memory 60 and delay buffer 61. The memory 60 supplied with the image signal through the high band image signal input terminal 11 produces the supplied signal in the order of input which comes in accordance with a system clock signal CK. The delay buffer 61 delays the high band image signal output from the memory 60 for the given time for which the first adaption factor fi is found.

The first adaption converter 50 has an absolute circuit 51a, first and second buffers 51b, 51c, an inverter 51d, second latches 51f, 51g, first and second inverters 51d, 51e, a comparator 51h, an OR gate 51i and an adaption factor memory 52. The absolute circuit 51a received the image signal from the high band image signal input terminal 11 provides an absolute value to the first and second buffers 51b, 51c. The first inverter 51d inverts an interval pulse to apply to the second buffer 51c. A latch 51f latches the signals output from the first and second buffers 51b, 51c. A comparator 51h compares the absolute value output from the absolute circuit 51a with the value output from the latch 51f for a given time T1 and then generates a greater value between the two values. The inverter 51e inverts the signal output from the comparator 51h to apply to the first buffer 51b. The OR gate logically combines the signal output from the comparator 51h and the interval pulse so as to apply the logically combined signal to the first latch 51f. The second latch 51g latches the output of the first latch 51f a maximum value for the given time T1 according to the interval pulse. Then, the adaption factor memory 52 produces the adaption index information and first adaption factor fi according to the level of maximum value output from the second latch 51g.

Figure 3:
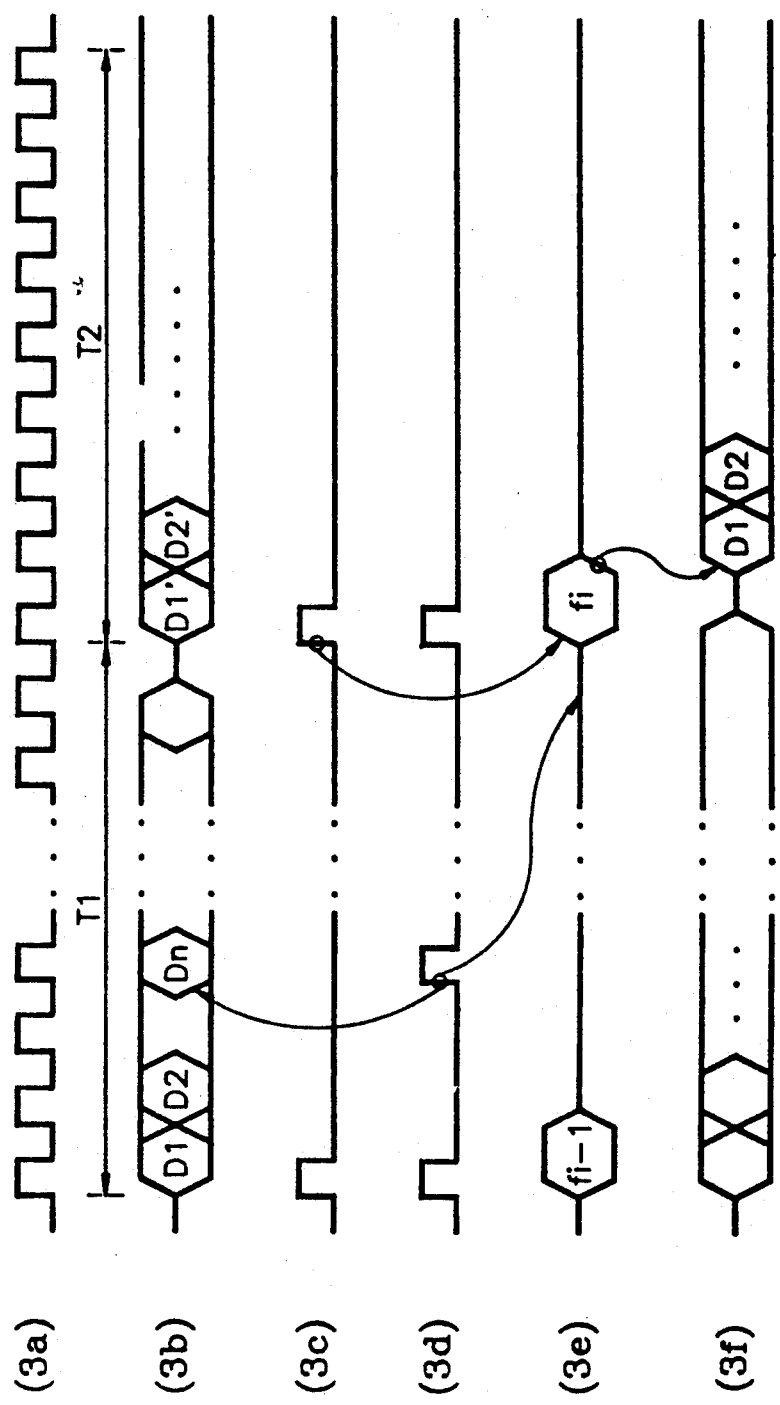
FIG. 3 is a timing diagram of FIG. 2.

Referring to FIG. 3, consisting of (3a) through (3f), timing waveforms used for the explanation of the operation of the circuit shown in FIG. 2, is illustrated. FIG. 3(a) shows the system clock. FIG. 3(b) shows an input timing of the high band image signal. FIG. 3(c) shows an interval pulse timing. FIG. 3(d) shows a clock input timing of the first latch 51f. FIG. 3(e) shows a timing of the adaption factor memory 52. FIG. 3(f) shows a output timing of the high band image signal delayed for the given time T1.

Figure 4A:
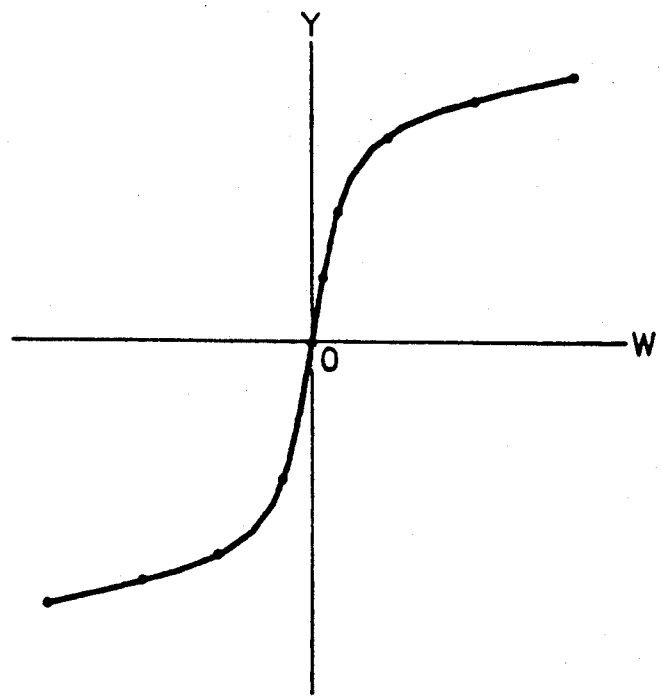
FIGS. 4A and 4B show the characteristic diagrams of first and second non-linear converters 16, 102 shown in FIG. 1.
Figure 4B:
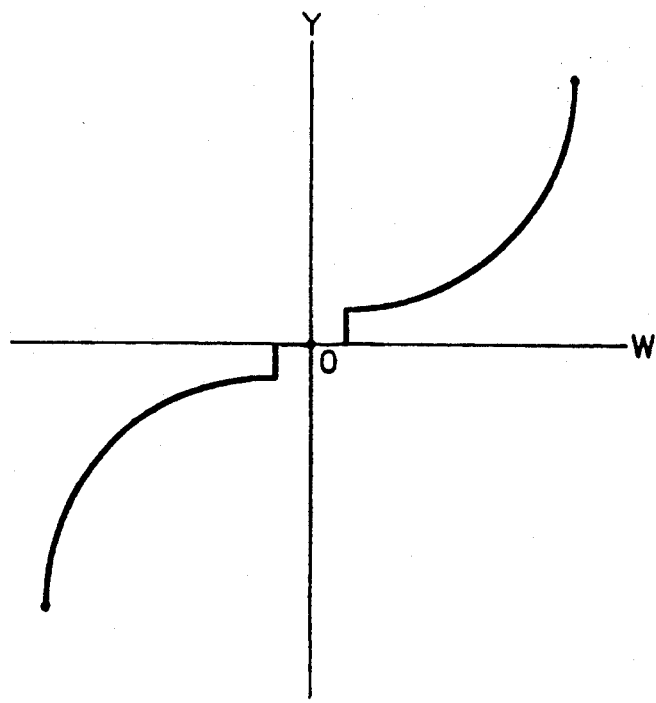

Referring to FIGS. 4A and 4B, FIG. 4A shows a conversion characteristic of the first non-linear converter 16 if FIG. 1. FIG. 4B shows a conversion characteristic of the second non-linear converter 102 of FIG. 1.

Figure 5:
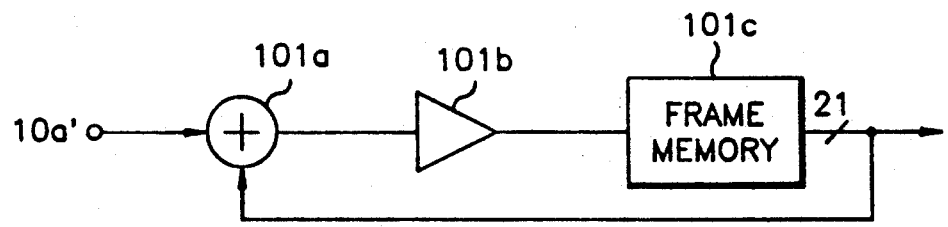
FIG. 5 is a detailed block diagram of a noise reducer 101 as shown in FIG. 1.

Referring to FIG. 5, The noise reducer 101 has an adder 101a coupled between the low band image signal reception input terminal 10a' and the low band image signal reception terminal 21, an integrator 101b for integrating the signal output from the adder 101a, and a frame memory 101c for receiving the integrated signal output from the integrator 101b to apply the signal thereof to the adder 101a according to a clock signal (not shown) so and as to transmit the signal of the frame memory 101c through the output terminal 21.

Figure 6:
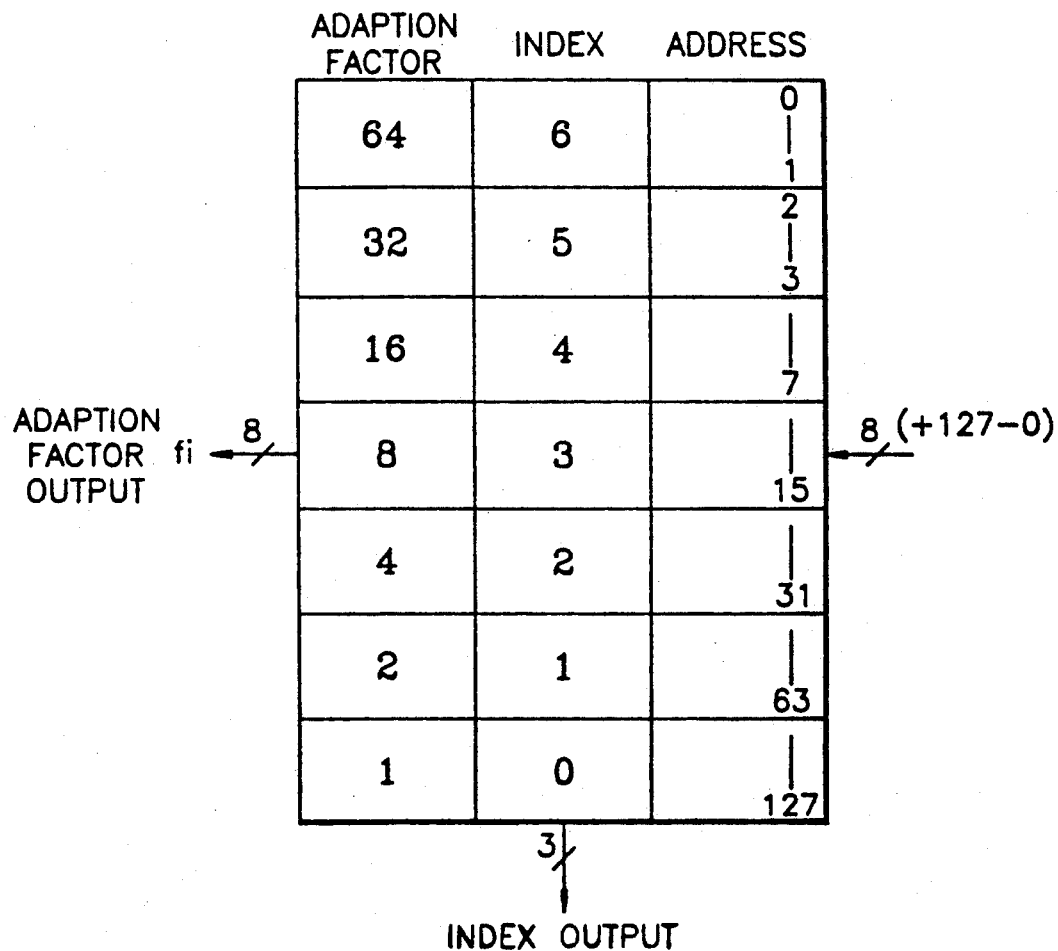
FIG. 6 is an adaption factor table according to the present invention.

Referring to FIG. 6, address level ranges from 0 to 127, index level ranges from 0 to 6 and the adaption factor fi values corresponding to the index 0 to 6 are 1, 2, 4, 8, 16, 32 and 64, respectively. The logic of the adaption factor table is stored in the adaption factor memory 52.

Figure 7:
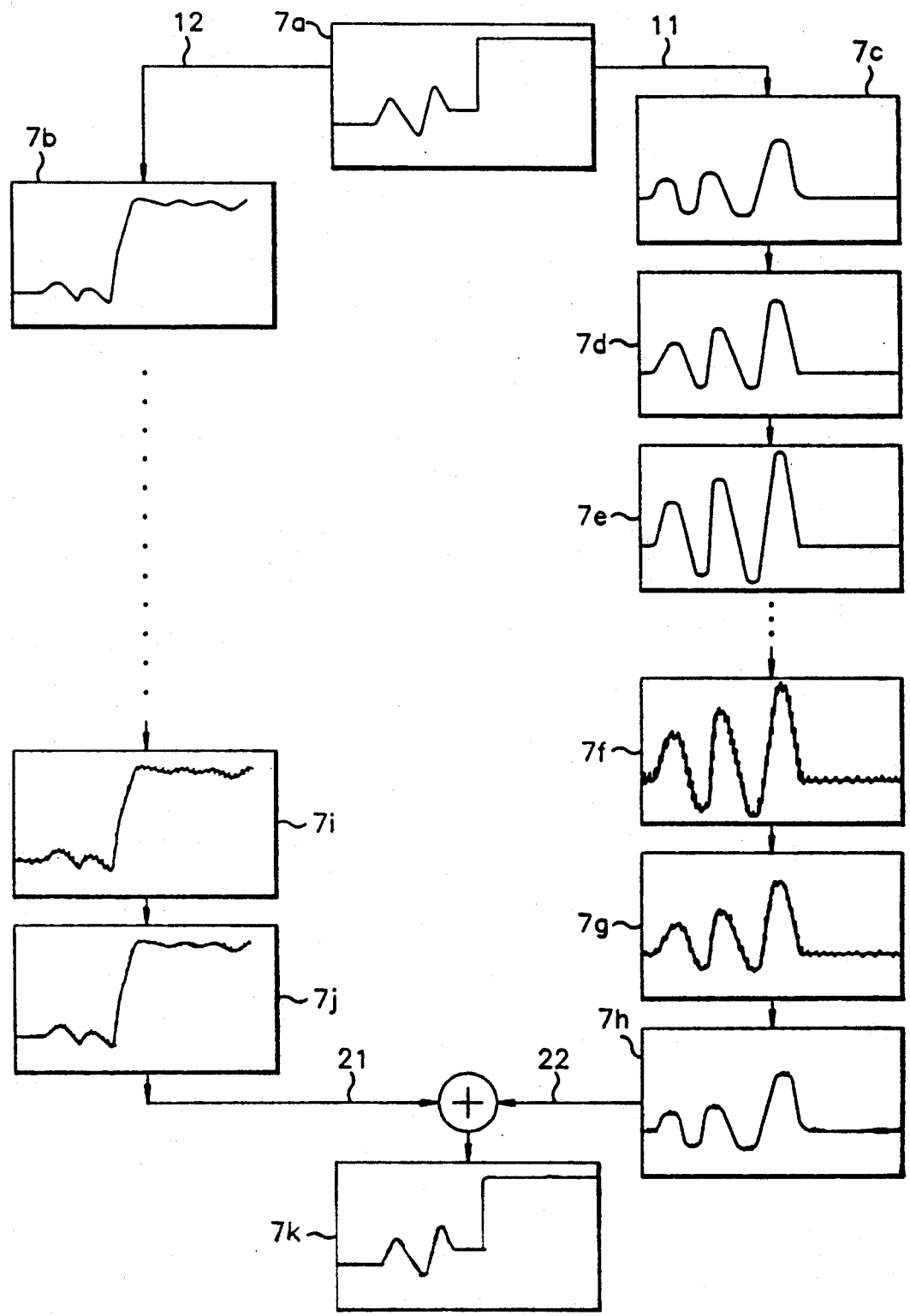
FIG. 7 is an image signal processing waveform according to the present invention.

Referring to FIG. 7, consisting of (7a) through (7k), (7a) is a waveform of original signal within a given adaption interval. (7b) is a waveform of the signal output from the low band image signal output terminal 12 of FIG. 1. (7c) is a waveform of the signal output from the high band image signal input terminal 11 of FIG. 1. (7d) is a waveform of the signal output from the multiplier 15 of FIG. 1, which is multiplied the waveform of the (7c) by the first adaption factor fi. (7e) is a waveform of the signal output from the first non-linear converter 16 of FIG. 1. (7f) is a waveform of the signal output from the high band image signal reception input terminal 10b' of FIG. 1. (7g) is a waveform of the signal output from the second non-linear converter 102 of FIG. 1. (7h) is a waveform of the signal output from the divider 27 of FIG. 1. (7k) is a waveform of the signal which is added the signal output from the low band image signal reception terminal 21 to the signal output from the high band image signal reception terminal 22 of FIG. 1.

Hereinafter, one embodiment of the present invention will be described in detail by referring to FIGS. 1 to 7.

In FIG. 1, the low band image signal of the image signal band is produced from the low band image signal output terminal 10a without noise reduction process via the low band image signal input terminal 12 of the transmitter 10, but the high band image signal therein is commonly applied both to the delay circuit 53 and the first adaption converter 50 via the high band image signal input terminal 11. In this case, the maximum value of the high band image signal component which is not high in amplitudes but high in transition as a whole, is calculated in the given adaption interval to be compared with a maximum transmissible peak value to provide a first adaption factor fi. The first adaption factor fi is multiplied by the high band image signal to increase the amplitude of the whole signal. Here, the first adaption factor fi must satisfy $$fi = \frac{K}{|h|_{max}},$$

in this case, the K is a maximum allowable value in band and the $|h|_{max}$ is the maximum value of the absolute value of the high band signal component. In the present invention, the adaption factor algorithm is solved by the adaption factor table as shown in FIG. 6.

The high band image signal is applied to the delay buffer 61 via the memory 60 according to the system clock CK as shown in the delay circuit of FIG. 2. In this case, the high band image signal applied to the delay buffer 61 is delayed for the given time T1 for which the first adaption factor fi is produced from the first adaption converter 50, as shown in the waveform (3f) of FIG. 3.

On the other hand, the absolute circuit 51a in the first adaption converter 50 provides an absolute value of the high band image signal to be applied to the first and second buffers 51b, 51c and the comparator 51h. In this case, if the interval pulse as shown in waveform (3c) of FIG. 3 comes into the clock terminal of the buffer 51c through the inverter 51d, the initial absolute value of the second buffer 51c is applied to the first latch 51f and its latched condition keeps until the next absolute value comes in. Then, if the next absolute value comes into the first and the second buffers 51b, 51c and comparator 51h, the comparator 51h compares the initial absolute value with the next absolute value to produce a greater value to be applied to the buffer 51b through the inverter 51e. The absolute value applied to the buffer 51b is applied again to the first latch 51f and the comparator 51h compares again the next absolute value with the absolute value of the first latch 51f.

Thus, the maximum absolute value is generated from the comparator 51h by continuously repeating such a process as described hereinabove for the given time T1, and the maximum absolute value is applied to the first latch 51f. If interval pulse comes in the last stage of the period T1, the maximum absolute value latched in the first latch 51f for the period T1 is applied to the second latch 51g. The second latch 51g applies the absolute value to the address terminal of adaption factor memory 52 according to the interval pulse. The adaption factor memory 52 generates the adaption index information and the first adaption factor fi stored therein, respectively, according to the level of the maximum absolute value. Here, the adaption factor table stored in the adaption factor memory 52 sets the maximum value level of amplitude at 127 and divides it into seven parts and then the first adaption factor fi is selected according thereto, as shown in FIG. 6.

The first adaption factor fi output from the adaption factor memory 52 is multiplied by the high band image signal delayed in the delay buffer 61 for the period T1 by the multiplier 15 so as to generate the maximum of amplitude as shown the waveform (7d) of FIG. 7. The high band image signal multiplied by the multiplier 15 is converted by the first non-linear converter 16. The amplitude of the low level component image signal is amplified exponentially more than that of the high level component image signal, as shown the waveform (7e) in FIG. 7, and then the amplified signal output from the first non-linear converter 16 is transmitted through the high band image signal output terminal 10b.

Then, the low band image signal output from the low band image signal output terminal 10a, is transmitted to the receiver 20 through the transmission channel. The high band image signal output from the high band image signal output terminal 10b, is transmitted to the receiver 20 through the transmission channel; and the index signal according to the first adaption factor fi output from the adaption index information output terminal 10c of the first adaption converter 50, is transmitted to the receiver 20 through the transmission channel Referring to the receiver 20, it follows a reversed process as described in the same manner as the transmission process of the transmitter 10 and so the description thereof is replaced by the image signal processing diagram of FIG. 7.

The low band image signal of the low band image signal output terminal 10a is transmitted to the low band image signal reception input terminal 10a, of FIG. 1, the transmitted signal having a channel noise as shown in waveform (7i) of FIG. 7. The low band image signal of the reception input terminal 10a, is applied to the noise reducer 101 having the properties of a time accumulation filter, so as to be generated the waveform (7j) of FIG. 7 in which a channel noise is almost removed.

On the other hand, The high band image signal of the high band image signal output terminal 10b is transmitted to the high band image signal reception input terminal 10b, of FIG. 1, the transmitted signal having a channel noise as shown in waveform (7f) of FIG. 7. Noise component of the high band image signal with lower amplitude is relatively reduced more significantly than that of the high band image signal with higher amplitude, by the second non-linear converter 102 introducing the conception of coring which processes into zero the value of the signal below the predetermined level as shown in the characteristic diagram of FIG. 4B, as shown in waveform (7g) of FIG. 7. Then, the signal output from the second non-linear converter 102 is applied to the divider 27 of FIG. 1. In the divider 27, it comes out as shown in the waveform (7h) by dividing the waveform (7g) by the second adaption factor fi output from the second adaption converter 70, and the low band image signal waveform (7j) is restored in the waveform (7k) of FIG. 7 by being mixed with the high band image signal waveform (7h). The last reception terminals 21, 22 of the receiver 20 of FIG. 1, receive the restored image signal waveform (7k) in which noise is removed as a whole.

Consequently, the present invention has the advantage of preventing the quality of picture from degradation by reason that the high band image signal with low amplitude is restored to the original signal and the whole channel noise thereof is also reduced relatively to the original image signal.

While the invention has been particularly shown and described with reference to a preferred embodiment, it will be understood by those skilled in the art that modifications in detail may be made without departing from the spirit and scope of the invention.

What is claimed is:

1. A method for transmitting and receiving an image signal by adaptive modulation in a system having a transmitter, a receiver, an adaption converter and an adaption factory memory, comprising the steps of:

separating said image signal into a low band image signal and a high band image signal and transmitting said low band image signal directly to said receiver;

delaying said high band image signal for a delay time to provide a delayed high band image signal;

comparing a maximum value of said high band image signal with a maximum transmissible peak value within an adaption interval to provide a first adaption factor and adaption index information;

multiplying said delayed high band image signal with said first adaption factor to provide a multiplied high band image signal;

non-linearly converting said multiplied high band image signal into a first converted high band image signal, and transmitting said first converted high band image signal to said receiver;

reducing noise components of the transmitted low band image signal received by said receiver to thereby restore the low band image signal;

non-linearly converting the transmitted high band image signal received by said receiver such that noise components of said transmitted high band image signal with lower amplitudes are reduced more significantly than the transmitted high band image signal with higher amplitudes to provide a second converted high band image signal; and dividing said second converted high band image signal by a second adaption factor, said second adaption factor being generated in association with said adaption index information to restore the high band image signal from the transmitter.

2. A method according to claim 1, wherein said maximum value of the high band image signal is generated by an adaption converter during an adaption interval, and wherein said adaption factor and index information are generated by an adpation factor memory.

3. A method according to claim 1, wherein said noise components of said transmitted low band image signal are reduced by time accumulated low-pass filtering of said transmitted low band image signal.

4. A method according to claim 1, wherein the amplitude of the high band image signal is clipped below a predtermined level, and said noise component of the high band image signal having lower amplitudes is relatively reduced more significantly than noise components of the high band image signal having higher amplitudes.

5. A system for transmitting and receiving a composite image signal by adaptive modulation, comprising:
   a transmitter for transmitting said composite image signal having a low band image signal and a high band image signal, said transmitter comprises;
      means for independently transmitting said low band image signal separated from said composite image signal;
      delay means for delaying said high band image signal separated from said composite image signal for a delay time period to provide a delayed high band image signal;
      first adaption converter means for producing a first adaption factor and adaption index information in dependence upon said high band image signal;
      multiplier means for multiplying said delayed high band image signal by said first adaption factor to provide a multiplied high band image signal; and
      first non-linear converter means for non-linearly converting said multiplied high band image signal to provide a first converted high band image signal for independent transmission of said first converted high band image signal; and
   a receiver for receiving the transmitted low band image signal and the transmitted first converted high band image signal from said transmitter, said receiver comprises;
      noise reducer means coupled to receive the received low band image signal, for reducing noise components of the received low band image signal by low-pass filtering said received low band image signal;
      second non-linear converter means for non-linearly converting the received first converted high band image signal to provide a second converted high band image signal;
      second adaption converter means for providing a second adaption factor in dependence upon reception of said adaption index information; and
      divider means for dividing said second converted high band image signal by said second adaption factor to reconstruct the high band image signal from said transmitter.

6. A system according to claim 5, wherein said delay means comprises:
   memory means for temporarily storing said high band image signal and generating the stored high band image signal in accordance with a system clock signal; and
   buffer means for delaying the output of said memory means for said delay time period corresponding to a time period while said first adaption factor is determined by said first adaption converter means.

7. A system according to claim 5, wherein said adaption converter means comprises:
   absolute value means for providing an absolute value of said high band image signal;
   first and second buffer means for buffering said absolute value of said high band image signal;
   first inverting means for inverting an interval pulse to provide an inverted interval pulse to said second buffer means;
   first latch means for latching the outputs of said first and second buffer means;
   comparator means for comparing repeatedly between the output of said absolute value means with the output of said first latch means for a first time period so as to generate the maximum value of said high band image signal;
   second inverting means for inverting the output of said comparator means to apply the output thereof to said first buffer means;
   OR gate means for logically combining the output of said comparator means and said interval pulse;
   second latch means for latching the output of said first latch means according to said interval pulse for a second time period to provide a latch signal representative of said maximum value of said high band image signal; and
   adaption factor memory means for generating said adaption index information and said first adaption factor according to the level of the maximum value output from said second latch means.

8. A system according to claim 5, wherein said noise reducer means comprises:
   adder means coupler to receive said transmitted low band image signal, for adding the received low band image signal with a noise reduced low band image signal in accordance with a system clock signal;
   integrator means for integrating the output of said adder means; and
   frame memory means for storing the output of said integrator means to provide said noise reduced low band image signal.

9. An apparatus having a transmitter and a receiver for transmitting and receiving an image signal by adaptive modulation, comprising:
   means for separating said image signal into a high band image signal and a low band image signal;
   means for transmitting said low band image signal at a low band transmission terminal of said transmitter;
   delay means for delaying said high band image signal for a delay period to provide a delayed high band image signal;
   first converter means for determining a maximum value representative of high oscillating transition of said high band image signal, and for comparing said maximum value with a maximum transmissible peak value during an adaption interval to provide a first adaption factor a corresponding adaption index information;
   multiplier means for multiplying said delayed high band image signal with said first adaption factor to provide a multiplied high band image signal; and second converter means for non-linearly converting said multiplied high band image signal into a signal suitable for transmission at a high band transmission terminal of said transmitter.

10. The apparatus according to claim 9, further comprised:

means for receiving the transmitted low band image signal and the transmitted high band image signal respectively at a low band reception terminal and a high band reception terminal of said receiver;

means for reducing noise components of the received low band image signal from said low band reception terminal by low-pass filtering said received low band image signal to restore the low band band image signal transmitted from said transmitter;

third converter means for providing a second adaption factor in dependence upon said adaption index information;

fourth converter means for non-linearly reconverting the received high band image signal into a signal representative of said multiplied high band image signal from said transmitter;

divider means for dividing said signal representative of said multiplied high band image signal by said second adaption factor to restore the high band image signal transmitted from said transmitter; and means for recombining the low band image signal and the high band image signal transmitted from said transmitter to provide said image signal.

11. The apparatus according to claim 9, wherein said delay means comprises:

memory means for temporarily storing said high band image signal and generating said high band image signal in accordance with a system clock signal; and means for delaying the generated high band image signal for said delay period to provide synchronicity with said first adaption factor.

12. The apparatus according to claim 9, wherein said first converter means comprises:

means for providing an absolute value from said high band image signal;

first buffer means for buffering said absolute value from said high band image signal in dependence upon an inverted compared value;

second buffer means for buffering said absolute value from said high band image signal in dependence upon an inverted time interval;

first inverter means for providing said inverted time interval by inverting a time interval;

second inverter means for providing said inverted compared value by inverting a compared value;

logic means for logically combining said compared value with said time interval to provide a logic value; first latch means for latching the outputs of said first and second buffer means in dependence upon said logic value to provide a first latched value;

comparator means for comparing said absolute value from said high band image signal with said first latched value to provide said compared value;

second latch means for latching said first latched value in dependence upon said time interval to provide a second latched value; and adaption factor memory means for providing said first adaption factor and said corresponding adaption index information in accordance with said second latched value corresponding to a maximum absolute value of said high band image signal.

13. The apparatus according to claim 12, wherein said adaption factor memory means stores an adaption index corresponding to a plurality of adaption factors and a plurality of amplitude levels of said high band image signal, for providing said first adaption factor and said corresponding adaption index information in accordance with amplitude levels of said maximum absolute value of said high band image signal.

14. The apparatus according to claim 10, wherein said noise reducing means comprises:

adder means for adding the received low band image signal with a noise reduced low band image signal in accordance with a system clock signal to provide an added low band image signal;

integrator means for integrating said added low band image signal to provide an integrated signal; and frame memory means for storing said integrated signal to provide said noise reduced low band image signal representative of the low band image signal transmitted from said transmitter.

15. The apparatus according to claim 14, wherein said first converter means comprises;

means for providing an absolute value from said high band image signal in dependence upon an inverted compared value;

second buffer means for buffering said absolute value from said high band image signal in dependence upon an inverted time interval;

first inverter means for providing said inverted time interval by inverting a time interval;

second inverter means for providing said inverted compared value by inverting a compared value;

logic means for logically combining said compared value with said time interval to provide a logic value;

first latch means for latching the outputs of said first and second buffer means in dependence upon said logic value to provide a first latched value;

comparator means for comparing said absolute value from said high band image signal with said first latched value to provide said compared value;

second latch means for latching said first latched value in dependence upon said time interval to provide a second latched value; and adaption factor memory means for providing said first adaption factor and said corresponding adaption index information in accordance with said second latched value corresponding to a maximum absolute value of said high band image signal.

16. The apparatus according to claim 15, wherein said adaption factory memory means stores an adaption index corresponding to a plurality of adaption factors and a plurality of amplitude levels of said high band image signal, for providing said first adaption factor and said corresponding adaption index information in accordance with amplitude levels of said maximum absolute value of said high band image signal.

* * * * *

UNITED STATES PATENT AND TRADEMARK OFFICE
CERTIFICATE OF CORRECTION

PATENT NO. : 5,220,424
DATED : 15 June 1993
INVENTOR(S) : Jin-Sung Oh

It is certified that error appears in the above-indentified patent and that said Letters Patent is hereby corrected as shown below:

Column 1 Line 68, change colon ":" to semicolon --;--;

Column 2 Line 12, delete "; and";

Column 2 Line 20, before "is" insert --1--;

Column 2 Line 22, delete colon ":";

Column 2 Line 40, after "In" insert --the--;

Column 3 Line 5-6, delete "transmitted";

Column 3 Line 18, after "51d," insert --first and--;

Column 4 Line 28, after "signal" delete "band":

Signed and Sealed this

Fourth Day of March, 1997

Attest:

BRUCE LEHMAN

Attesting Officer

Commissioner of Patents and Trademarks